United States Patent [19]

Knight et al.

[11] Patent Number: 4,888,903

[45] Date of Patent: Dec. 26, 1989

[54] GAME CALL

[76] Inventors: Harold W. Knight; David E. Hale, both of Box 468, Cadiz, Ky. 42211

[21] Appl. No.: 251,540

[22] Filed: Sep. 30, 1988

[51] Int. Cl.[4] .............................................. A63H 5/00
[52] U.S. Cl. .......................................... 43/1; 446/207; 446/177; 446/178
[58] Field of Search .......................... 46/207, 208, 209; 84/377, 378, 360, 363, 380, 383 A, 408; 43/1

[56] References Cited

U.S. PATENT DOCUMENTS

| | | | |
|---|---|---|---|
| 825,610 | 7/1906 | Oh | 446/208 |
| 827,819 | 8/1906 | Reynolds | 446/208 |
| 2,745,214 | 5/1956 | Lawson | 446/207 |
| 3,075,317 | 1/1963 | Craft | 446/207 |
| 3,955,313 | 4/1976 | Faulk | 446/208 |
| 4,211,031 | 1/1980 | Gambino | 446/208 |

FOREIGN PATENT DOCUMENTS 479612  5/1949  Canada .................. 446/208

Primary Examiner—Nicholas P. Godici
Assistant Examiner—Michael William Starkweather
Attorney, Agent, or Firm—Middleton & Reutlinger

[57] ABSTRACT

A reed-type game call which can be operated by blowing and sucking on a single end of the call. This permits a caller to make one type of sound when blowing out through the call, and a different or same sound when sucking in, thus allowing for rapid sound successions. This permits the caller to sound like a whole flock of geese, or ducks with the rapid varied sounds; it also permits a hyperventilating deer sound.

5 Claims, 2 Drawing Sheets

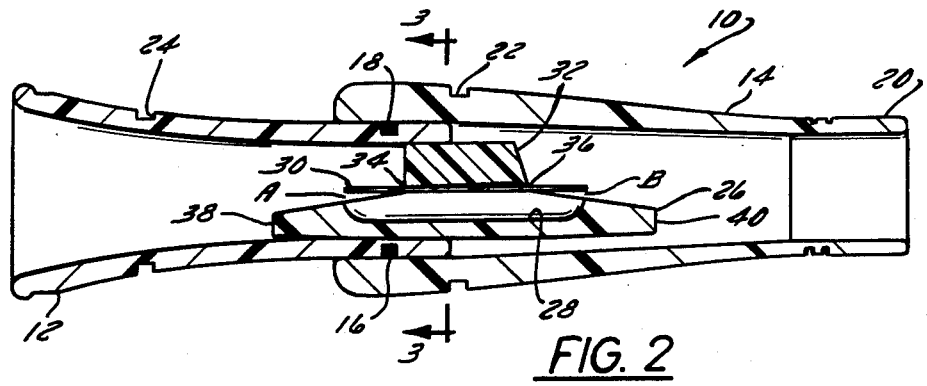
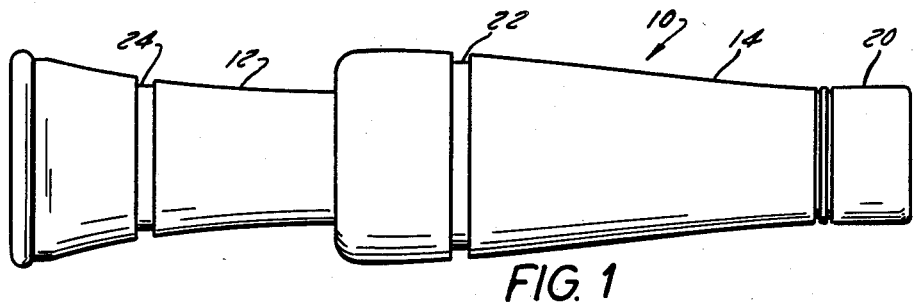
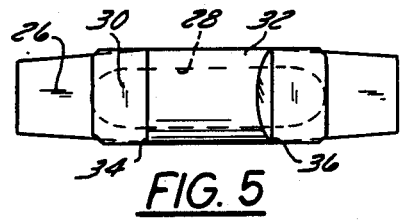
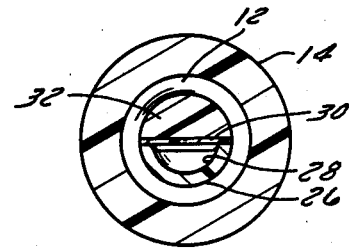
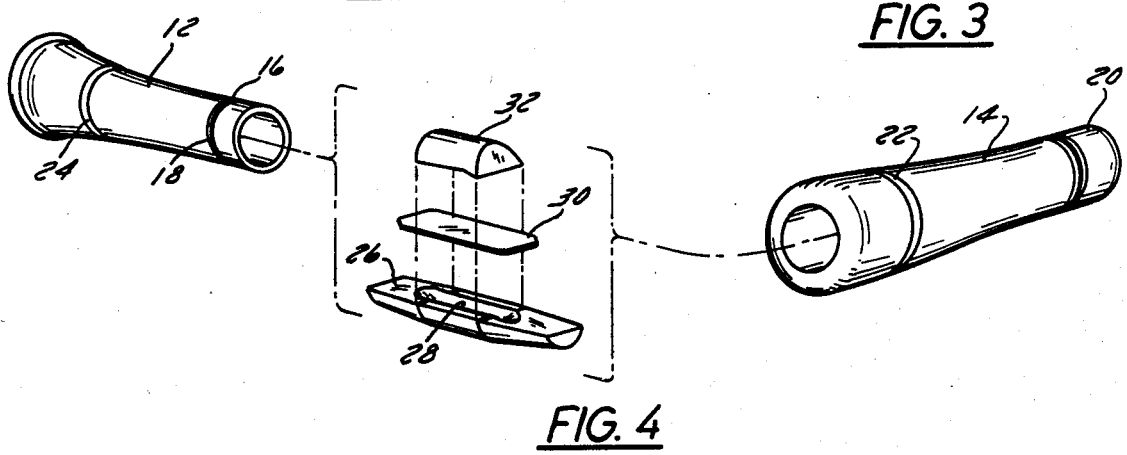

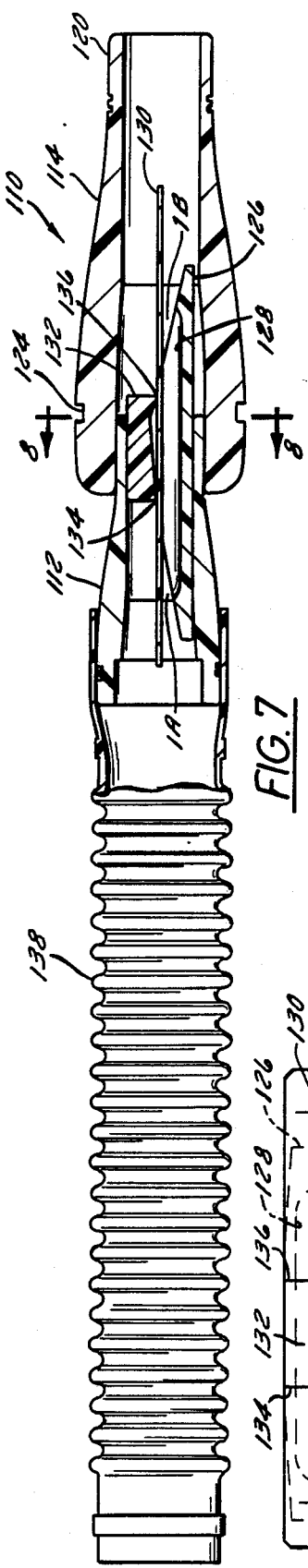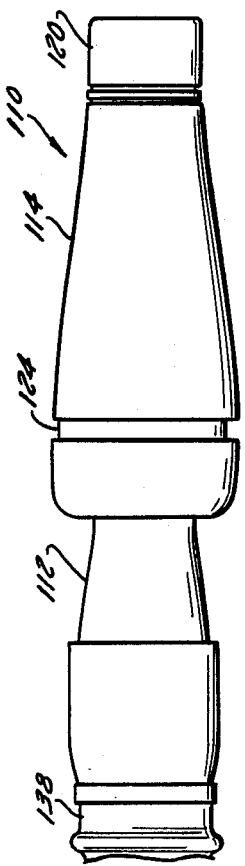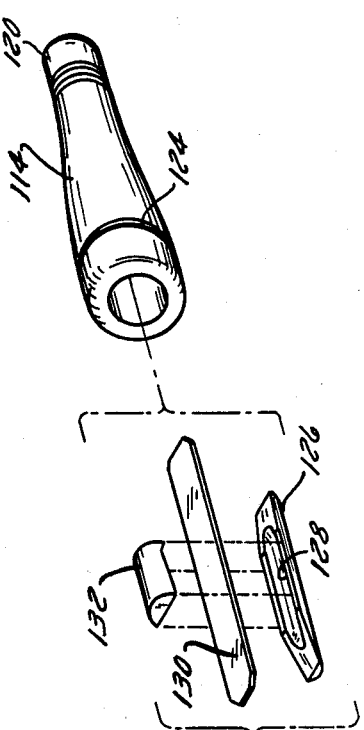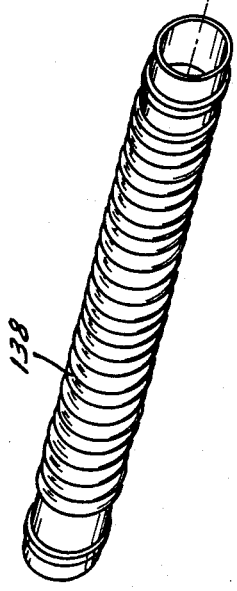

GAME CALL

BACKGROUND AND SUMMARY OF THE INVENTION

This invention pertains to reed-type game calls used by hunters for attracting fowl or mammals.

Game calls have been used for many years by hunters trying to attract game within the range of accuracy of their weapons. Duck and goose calls have been popular for a long time. More recently, deer calls have become popular. Various advances have been made over time to make the calls imitate the actual sounds of the game more closely.

In the case of goose calls and deer calls, there has been an obstacle to duplicating the actual animal sounds, primarily because a human blowing into a call can only make so many sounds in a certain period of time (frequency of sounds). Geese and deer are known to make a higher frequency of sounds than is possible by a human blowing into a call. A hunter trying to imitate the sound of a flock of geese would find it impossible with the existing technology, because he could not blow into the call rapidly enough to make all the different sounds. A hunter trying to imitate the sound of a deer that is hyperventilating could not blow into the call rapidly enough to make the sounds corresponding to the rapid breathing in and out.

The reed calls of the prior art do not permit a hunter to make sounds any faster than he can blow into the call and, therefore, have limited the ability of hunters to imitate the animal sounds. The present invention overcomes this problem of the prior art by making a game call that produces lifelike sounds by blowing into and sucking on the same end of the call.

The present invention permits a hunter to make one type of sound when blowing out through the call, the same or a different sound when sucking in, and to repeat the sounds in rapid succession.

This permits a caller to sound like a whole flock of geese with rapid-fire, varied sounds. It also permits him to sound like a hyperventilating deer.

Thus, the present invention permits a game caller to much more closely imitate the real calls of geese and deer.

Many obstacles had to be overcome by the present inventors in order to make the present invention. First, they had to think of the concept of making a two-directional call to solve the basic problem. But then they encountered many problems which prevented the two-directional call from making authentic sounds. One of the problems is that a human cannot easily create as great a pressure difference sucking or inhaling on a game call as he can blowing out. Therefore, he cannot pull in the big puffs of air needed to make the reed vibrate properly. He also has far less control in sucking than in blowing and so, even if something close to an authentic sound could be made, he cannot vary the sounds as needed to get the variety of sounds needed for an authentic call. The lower air flow rate in sucking also means that the volume of the sound may not be loud enough to attract the game. In addition, when sucking on a call, the air flow stops at the caller's mouth and cannot be extended or varied in length as with blowing out on a call.

The present inventors worked for about ten years to develop a call that would sound authentic when sucking on the mouthpiece. Initially, sucking on the far end of traditional calls produced either no sound at all or nonsensical sounds that did not begin to imitate the game they were able to call when blowing on the mouthpiece. The inventors found that the reed on the far end that made the sound upon inhaling had to be thin enough that the caller could make it vibrate easily. The reed on that end also had to be relatively short, preferably shorter than the front end of the reed. The trough had to be relatively short to permit air to flow along it in two directions at rapid intervals. Many attempts and adjustments were made to finally obtain a functional call. The final result is a call that permits a caller to make sounds in rapid sequence to more closely imitate the natural sounds than was possible before the present invention.

BRIEF DESCRIPTION OF THE DRAWINGS

FIG. 1 is a side view of a goose call made in accordance with the present invention.

FIG. 2 is a side sectional view of the goose call shown in FIG. 1.

FIG. 3 is a view taken through the section 3—3 of FIG. 2.

FIG. 4 is an exploded perspective view of the goose call shown in FIG. 1.

FIG. 5 is a top view of the stopper, reed, and inner base member portions of FIG. 2.

FIG. 6 is a broken away side view of a deer call made in accordance with the present invention.

FIG. 7 is a side view partially in section of the deer call shown in FIG. 6.

FIG. 8 is a view taken along the section 8—8 of FIG. 7.

FIG. 9 is an exploded perspective view of the deer call shown in FIG. 6.

FIG. 10 is a top view of the stopper, reed, and inner base member portions of FIG. 7.

DESCRIPTION OF THE PREFERRED EMBODIMENTS

The goose call, shown in FIGS. 1–4, has an outer casing 10 in the general shape of a tube. The outer casing 10 is made of two tapered tubular members, the inner tubular member 12, and the outer tubular member 14. The inner and outer tubular members 12, 14 are removably press fit together, and an O-ring seal 16, which is retained in an annular indentation 18 of the inner tubular member 12, provides a seal between the inner tubular member and the outer tubular member 14 to prevent air from flowing through the joint between those members.

The right end of the outer tubular member 14 serves as the mouthpiece 20. The outer tubular member 14 tapers from a smaller diameter at the mouthpiece 20 to a larger diameter at the other end, where the outer tubular member 14 mates with the inner tubular member 12. Similarly, the inner tubular member 12 has a smaller diameter where it meets the outer tubular member 14, and tapers outward toward its other end. Additional annular indentations 22, 24 on the outer tube 14 and the inner tube 12, respectively, may serve to hold a string or lanyard (not shown) which the hunter uses to carry the call.

Inside the outer tubular casing 10 are three pieces. The first is the inner base member 26 which defines a trough 28 in its upper surface. In this embodiment, the inner base member 26 is approximately 27/16 inches long. The trough is approximately 113/32 inches long and 7/16 inches wide. The outside contour of the bottom of the inner base member 26 is semi-circular in cross-section so that it fits snugly inside the inner tubular member 12. The trough 28 ends well before the ends 38, 40 of the inner base member 26. Both end portions of the inner base member 26 have a downward taper in their upper surface which begins before the ends of the trough 28.

A reed 30 is lying on top of the inner base member 26. The reed is a straight, flat, flexible member preferably between 0.0075 inches and 0.011 inches thick and ⅜ inches wide. The reed 30 rests on the sides of the trough 28 and extends almost exactly to the ends of the trough 28 at both ends. A stopper 32 presses the reed 30 down against the inner base member 26. The stopper 32 is semicircular in cross-section on its upper surface in order to fit snugly in the inner tubular member 12. Its lower surface is essentially flat, although it does have some relief so that the end points 34, 36 exert pressure against the reed 30 to create pressure points. The left end segment of the reed 30 between the pressure point 34 and the left end is approximately 5/16 inches long, and the right end segment of the reed 30 between the pressure point 36 and the right end is approximately ⅜ inches long.

To assemble the goose call, the reed 30 is first placed over the trough 28, with the ends of the reed 30 terminating at the ends of the trough 28. Then the stopper 3 is placed on top of the reed 30. It is intended that small marks (not shown) will be made on the base member 26 indicating where the ends 34, 36 of the stopper 32 should be located. In this particular case, the stopper 32 is about ¾ inches long and extends farther toward the left end of the reed 30 than to the right end, making the effective length of the left end of the reed (the left end segment) shorter than the right end segment. Then the assembly of base member 26, reed 30 and stopper 32 are inserted into the inner tubular member 12 until they are stopped with a press fit. Then, the outer tubular member 14 is pressed over the inner tubular member 12 until it is press fit.

The reed 30, as shown in FIG. 2, is flat and straight, and the inner base member 26 tapers away from the reed 30 at an angle A on the left side and an angle B on the right side. In this particular case, the angles A and B are equal. However, it may be desirable to make the angle A greater than the angle B to make it easier for air to enter when inhaling.

The thickness of the reed 30 is very important to its correct operation. A reed that is too thick is not flexible enough to vibrate properly, and a reed that is too thin may be too flexible to vibrate properly. The thickness of the reed preferably should not be under 0.007 inches or over 0.011 inches.

To use the call, the caller places his mouth over the right end of the call and blows into it, so that air enters underneath the right end of the reed 30, through the trough, and out the left end of the call. This causes the right end portion of the reed from the pinch point 36 to the right end of the reed to vibrate, causing a sound. Then, the caller inhales, pulling air in from the left side of the call so that it enters under the left end of the reed 30, through the trough 28, and out the right end of the call, into the caller's mouth. This causes the left end portion of the reed 30 to vibrate between the pinch point 34 and the left end of the reed, causing a sound. In this particular case, the stopper 32 is located so that the left end portion of the reed 30 between the pinch point 3 and the left end is shorter than the right end portion of the reed between the pinch point 36 and the right end. The fact that the left end portion of the reed 30 is shorter than the right end makes it easier for the caller to operate on the inhaling portion of the call, which is the more difficult portion. Also, if the left end of the reed 30 is kept thin, it will be flexible enough to permit the caller to cause it to flex and vibrate as is needed in order to make the calling sound.

Now the hunter can make a goose sound blowing into the call, with air flowing from right to left, and sucking on the same end of the call, with air flowing from left to right. This permits him to make a variety of sounds quickly and gives him the ability to more closely imitate the actual natural sounds than was possible with calls of the prior art.

The deer call is shown in FIGS. 6 through 10, and, as the deer call is described, similar parts will be given correspondingly similar numbers to those of the goose call described previously. Again, the deer call is made up of an outer casing 110 which has two members, the inner tubular member 112 and the outer tubular member 114. Both of the tubular members 112, 114 taper so that they are smaller on the right end and larger on the left end. Again there is a trough 128 formed in the inner base member 126. The trough is approximately ¼ inches wide and 2½ inches long. The trough terminates before the ends of the inner base member, which is approximately 3 inches long. A flat, flexible reed 130 is lying on top of the base member 126. The reed is preferably about 0.0075 inches thick and 7/16 inches wide. A stopper 132 is about ¾ inches long and lies on top of the reed 130. At the left end of the inner tubular member 112 is a corrugated tubular extension 138, which is press fit over the left end of the inner tubular member 112. In this case, the reed 130 is much longer than the reed 30 of the goose call, and the reed 130 extends beyond the ends of the trough 128 as well as beyond the ends of the base member 126. Again the base member 126 has a tapered upper surface, creating angles 1A and 1B. Again, the stopper 132 is undercut to create two pinch points 134, 136. The left end segment of the reed 130 between the pinch point 134 and the end is also approximately 1⅜ inches long and is shorter than the right end segment of the reed, between the pressure point 136 and the end, which is about 1⅝ inches long. In order for the deer call to function properly, the reed 130 must be very thin and flexible. The preferred material is plastic.

In using this deer call, the hunter again blows into the right end of the call, causing the right end segment of the reed 130 between the pinch point 136 and the right end of the reed to vibrate, creating the guttural type of sound that deer make. Then, the hunter inhales, pulling air through the left end of the corrugated tubing 138, into the left end of the inner tubular member 112, then under the left end of the reed 130, causing the left end segment of the reed to vibrate. The hunter may, by varying his technique, create one sound upon exhaling and another upon inhaling or may make similar sounds in both directions but in rapid succession.

In the embodiments described above, it is contemplated that all the parts of the calls are made of molded plastic except the reed, which is cut from a thin plastic sheet. However, it is known in the art to use many other materials and manufacturing processes.

While two embodiments have been shown and described, it will be obvious to those skilled in the art that modifications may be made to the preferred embodiments without departing from the scope of the present invention.

What is claimed is:

1. A game call, comprising:
    a tubular casing, with one end of the tubular casing defining a mouthpiece and the other end defining an outlet;
    a base member inside said tubular casing defining an elongated trough in its upper surface and defining a first ramp tapering downward toward said outlet and a second ramp tapering downward toward said mouthpiece;
    a reed overlying said trough;
    a stopper located over said reed and press fit inside said tubular casing so as to define two pinch points on said reed, leaving first and second end segments of said reed free to vibrate, wherein the first end segment of said reed is directed toward said outlet and the second end segment of said reed is directed toward said mouthpiece;
    wherein said reed is substantially between 0.007 inches and 0.011 inches thick and the trough is less than three inches long, and wherein said game call is adapted to imitate the sound of a given type of game both upon blowing into said mouthpiece and upon sucking on said mouthpiece.

2. A game call as recited in claim 1, wherein the first end segment of said reed is shorter than the second end segment.

3. A game call as recited in claim 1, wherein the first end segment of the reed is approximately 5/16 inches long and the second end segment of the reed is approximately ⅜ inches long.

4. A game call is recited in claim 1 or 2, wherein the ends of the reed terminate substantially at the ends of the trough.

5. A game call as recited in claim 1 or 2, wherein the reed is longer than the base member.

* * * * *

UNITED STATES PATENT AND TRADEMARK OFFICE
CERTIFICATE OF CORRECTION

PATENT NO. : 4,888,903

DATED : December 26, 1989

INVENTOR(S) : Harold W. Knight and David E. Hale

It is certified that error appears in the above-identified patent and that said Letters Patent is hereby corrected as shown below:

Column 3, line 29, after "Then the stopper" delete "3" and insert therefor --32--. Column 4, line 2, delete "3" and insert therefor --34--.

Signed and Sealed this

Nineteenth Day of February, 1991

*Attest:*

HARRY F. MANBECK, JR.

*Attesting Officer*   *Commissioner of Patents and Trademarks*